US012579631B2

(12) United States Patent　　　　(10) Patent No.:　US 12,579,631 B2
Vukkadala et al.　　　　　　　　　　(45) Date of Patent:　　Mar. 17, 2026

(54) METHOD TO CALIBRATE, PREDICT, AND CONTROL STOCHASTIC DEFECTS IN EUV LITHOGRAPHY

(71) Applicant: KLA Corporation, Milpitas, CA (US)

(72) Inventors: Pradeep Vukkadala, Santa Clara, CA (US); Cao Zhang, Ann Arbor, MI (US); Anatoly Burov, Austin, TX (US); Guy Parsey, Ann Arbor, MI (US); Kyeongeun Ko, Gyeonggi-do (KR); Sergei G. Bakarian, Mountain View, CA (US); Janez Krek, Milan, MI (US); Kunlun Bai, Campbell, CA (US); Craig Higgins, Cedar Park, CA (US); John S. Graves, Austin, TX (US); Mark D. Smith, San Jose, CA (US); John J. Biafore, North Scituate, RI (US)

(73) Assignee: KLA Corporation, Milpitas, CA (US)

( * ) Notice: Subject to any disclaimer, the term of this patent is extended or adjusted under 35 U.S.C. 154(b) by 0 days.

(21) Appl. No.: 18/894,596

(22) Filed: Sep. 24, 2024

(65) Prior Publication Data

US 2025/0104215 A1　　Mar. 27, 2025

Related U.S. Application Data

(60) Provisional application No. 63/540,605, filed on Sep. 26, 2023.

(51) Int. Cl.
G06T 7/00　　　　　(2017.01)
(52) U.S. Cl.
CPC .......... G06T 7/0004 (2013.01); G06T 7/0006 (2013.01); G06T 2207/20081 (2013.01);
(Continued)

(58) Field of Classification Search
CPC ................ G06T 7/0004; G06T 7/0006; G06T 2207/20081; G06T 2207/30148; G06T 2207/30164; G06T 2207/30242
(Continued)

(56) References Cited

U.S. PATENT DOCUMENTS

| 10,818,001 B2 | 10/2020 | Leung et al. |
| 10,901,325 B2 | 1/2021 | Gurevich et al. |
(Continued)

FOREIGN PATENT DOCUMENTS

WO　　　2023027689 A1　　3/2023

OTHER PUBLICATIONS

WIPO, International Search Report and Written Opinion issued for PCT/US2024/048250, Jan. 2, 2025.
Latypov et al., Calibration of Gaussian random field stochastic EUV models, Proceedings of SPIE Vol. 12051, Optical and EUV Nanolithography XXXV, 2022, 1205105.
(Continued)

*Primary Examiner* — Sheela C Chawan
(74) *Attorney, Agent, or Firm* — Hodgson Russ LLP

(57) ABSTRACT

An initial probability of occurrence of a stochastic defect over an inspection area of a workpiece is received. All locations of the stochastic defects are sorted by the initial probability of occurrence. A cumulative expected defect count is determined and the cumulative expected defect count is normalized to be a fraction of a total expected defect count. A number of defect locations is determined to capture potential stochastic defects above a threshold of total stochastic defects.

20 Claims, 6 Drawing Sheets

(52) U.S. Cl.
CPC .............. *G06T 2207/30148* (2013.01); *G06T 2207/30164* (2013.01); *G06T 2207/30242* (2013.01)

(58) Field of Classification Search
USPC ................................................ 382/100, 149
See application file for complete search history.

(56) References Cited

U.S. PATENT DOCUMENTS

| | | | |
|---|---|---|---|
| 11,061,373 | B1 | 7/2021 | Khaira et al. |
| 11,966,156 | B2 | 4/2024 | Vukkadala et al. |
| 2013/0007684 | A1* | 1/2013 | Kramer ................. G06F 30/398 716/112 |
| 2018/0275523 | A1* | 9/2018 | Biafore .............. G01N 21/8851 |
| 2018/0300870 | A1* | 10/2018 | Park ...................... G06T 7/0006 |
| 2020/0082523 | A1* | 3/2020 | Leung ................ G01N 21/9501 |
| 2020/0161081 | A1* | 5/2020 | Pathangi ................. H01J 37/28 |
| 2021/0225609 | A1 | 7/2021 | Mack |
| 2022/0129775 | A1 | 4/2022 | Burov et al. |
| 2023/0055365 | A1 | 2/2023 | Kim et al. |
| 2023/0326710 | A1 | 10/2023 | Eyring |

OTHER PUBLICATIONS

Wang et al., Stochastic defect criticality prediction enabled by physical stochastic modeling and massive metrology, Proceedings of SPIE 11609, Extreme Ultraviolet (EUV) Lithography XII, 2021, 1160916.

De Bisschop, Stochastic printing failures in extreme ultraviolet lithography, Journal of Micro/Nanolithography MEMS, and MOEMS, 2018, Vol. 17, Issue 4, 041011.

De Bisschop et al., Empirical correlator for stochastic local CD uniformity in extreme ultraviolet lithography, Journal of Micro/Nanopatterning, Materials, and Metrology, 2022, Vol. 21, Issue 3, 033201.

Levinson et al., Predicting very rare stochastic defects in EUVL processes for full-chip correction and verification, Proceedings of SPIE 11609, Extreme Ultraviolet (EUV) Lithography XII, 2021, 1160915.

Halder et al., Process window discovery methodology for extreme ultraviolet (EUV) lithography, Proceedings of SPIE 10959, Metrology, Inspection, and Process Control for Microlithography XXXIII, 2019, 109591V.

* cited by examiner

METHOD TO CALIBRATE, PREDICT, AND CONTROL STOCHASTIC DEFECTS IN EUV LITHOGRAPHY

CROSS-REFERENCE TO RELATED APPLICATIONS

This application claims priority to the provisional patent application filed Sep. 26, 2023, and assigned U.S. App. No. 63/540,605, the disclosure of which is hereby incorporated by reference.

FIELD OF THE DISCLOSURE

This disclosure relates to metrology of stochastic defects during semiconductor manufacturing.

BACKGROUND OF THE DISCLOSURE

Evolution of the semiconductor manufacturing industry is placing greater demands on yield management and, in particular, on metrology and inspection systems. Critical dimensions continue to shrink, yet the industry needs to decrease time for achieving high-yield, high-value production. Minimizing the total time from detecting a yield problem to fixing it maximizes the return-on-investment for a semiconductor manufacturer.

Fabricating semiconductor devices, such as logic and memory devices, typically includes processing a semiconductor wafer using a large number of fabrication processes to form various features and multiple levels of the semiconductor devices. For example, lithography is a semiconductor fabrication process that involves transferring a pattern from a reticle to a photoresist arranged on a workpiece, such as a semiconductor wafer. Additional examples of semiconductor fabrication processes include, but are not limited to, chemical-mechanical polishing (CMP), etching, deposition, and ion implantation. An arrangement of multiple semiconductor devices fabricated on a single semiconductor wafer may be separated into individual semiconductor devices.

Inspection processes are used at various steps during semiconductor manufacturing to detect defects on wafers to promote higher yield in the manufacturing process and, thus, higher profits. Inspection has always been an important part of fabricating semiconductor devices such as integrated circuits (ICs). However, as the dimensions of semiconductor devices decrease, inspection becomes even more important to the successful manufacture of acceptable semiconductor devices because smaller defects can cause the devices to fail. For instance, as the dimensions of semiconductor devices decrease, detection of defects of decreasing size has become necessary because even relatively small defects may cause unwanted aberrations in the semiconductor devices.

Defect review typically involves re-detecting defects that were detected by an inspection process and generating additional information about the defects at a higher resolution using either a high magnification optical system or a scanning electron microscope (SEM). Defect review is typically performed at discrete locations on specimens where defects have been detected by inspection. The higher resolution data for the defects generated by defect review is more suitable for determining attributes of the defects such as profile, roughness, or more accurate size information.

Photolithography can have defects driven by the quantized nature of light and materials. For example, light is quantized into photons, and the chemical reactants in photoresist are discrete molecules. These are often called shot noise defects or stochastic defects. These stochastic defects can be prevalent for extreme ultraviolet (EUV) lithography, but can appear at exposure wavelengths used in other lithographic processes such as ArF immersion. "Stochastic" means that the average behavior may be within desired specification (e.g., photoresist width, tip-to-tip measurement for line-ends, or photoresist thickness) while simultaneously exhibiting fluctuations that cause the pattern to fail (e.g., bridging or breaking for a line/space pattern) with a non-zero probability. Given that a workpiece includes billions of transistors, even small failure probabilities can lead to substantial yield loss.

Stochastic defects may present multiple challenges in a fabrication environment. Typically, defects may be assumed to be deterministic such that a known defect will consistently be present when fabricated according to a known production recipe including a pattern of elements to be fabricated on a sample and exposure parameters. For example, process window qualification (PWQ) typically identifies process-limiting defects that always occur when exposure conditions fall outside of a process window. In an instance, a process window may define limits on the defocus associated with the position of the sample along the optical axis of the lithography tool (e.g., the focal position of the sample) or the dose of energy from the illumination source incident on the sample during exposure.

EUV lithography processes used in high-end semiconductor device fabrication can result in defects on the workpiece that tend to be stochastic in nature. This can occur immediately after development of a photoresist image or further downstream such as during etch processing. Mathematical models have been used to predict the behavior of these stochastic defects to aid in manufacturing process optimization. Generalized empirical models were previously built mostly with experimental data at the foundation and sometimes with physical constraints. These generalized empirical models rely on large quantities of optical inspection and SEM-reviewed defectivity data to build and calibrate the model.

Empirical models also were built with experimental SEM data. These usually used less data to build the model by taking advantage of geometric symmetries on design features (e.g., 1D line/space features or contact hole arrays). However, these empirical models tended to be applicable only to specific design features and, hence, impractical for use in a general manner across complex design layouts.

Accelerated Rigorous models were built to emulate results of full 3D Rigorous Physics simulators. These models typically needed less experimental data to build. Often, lower-fidelity/high-precision experimental data was sufficient to build these models instead of high-resolution SEM data. Additional experimental data was typically used to calibrate/fine-tune the model to align it with observed defectivity.

Empirical models tended to be applicable to specific design features, which was impractical to use across complex design layouts. It was time consuming and expensive to collect experimental datasets needed to build and calibrate these models. The calibration of these models could require extensive curation of experimental datasets to improve prediction quality, making them difficult to implement. It also may be either intractable or impractical to build large curated datasets that enable calibration of models for predicting sufficiently low probability hotspots across sufficiently large variety of complex designs. Techniques that rely on experimental observations of defects at off-nominal operating conditions and extrapolation to nominal operating conditions may be potentially erroneous and may risk under/over prediction of defect-free process window. Improved systems and techniques are needed.

BRIEF SUMMARY OF THE DISCLOSURE

A method is provided in a first embodiment. The method includes receiving, at a processor, an initial probability of occurrence of a stochastic defect over an inspection area of a workpiece. The initial probability of occurrence of a stochastic defect is generated using a model. Using the processor, all locations of the stochastic defects are sorted by the initial probability of occurrence. Using the processor, a cumulative expected defect count is determined. Using the processor, the cumulative expected defect count is normalized to be a fraction of a total expected defect count thereby determining a normalized cumulative expected defect count. Using the processor, a number of defect locations is determined to capture potential stochastic defects above a threshold of total stochastic defects.

The method can further include associating the normalized cumulative expected defect count with a total count for the inspection area.

The method can further include associating the normalized cumulative expected defect count with the inspection area.

The method can further include determining the initial probability of occurrence of a stochastic defect with the model using the processor.

The method can further include selecting a subset of locations above the threshold using the processor; grouping the subset of locations by pattern shape using the processor thereby forming pattern shape groups; and sorting the pattern shape groups by an expected defect count using the processor. The cumulative expected defect count is based on the pattern shape groups.

The method can further include selecting a subset of locations using the processor by probability. The cumulative expected defect count is based on the subset of locations, and wherein the threshold is a fraction of defectivity.

The method can further include selecting a subset of locations using the processor by probability. The cumulative expected defect count is based on the subset of locations. The threshold may be a number of locations.

The method can further include selecting a subset of locations using the processor by probability. The cumulative expected defect count is based on the subset of locations. The threshold may be a probability value.

The method can further include selecting, using the processor, one or more of the defect locations above the threshold thereby generating selected defect locations; grouping, using the processor, the selected defect locations by pattern shapes on the workpiece; determining, using the processor, pattern sensitivity based on at least one geometric distance in the pattern shapes; and determining, using the processor, an expected defect count for each of the pattern shapes. Optionally, a subset of the pattern shapes can be inspected.

The method can further include selecting, using the processor, one or more of the defect locations above the threshold thereby generating selected defect locations; grouping, using the processor, the selected defect locations by pattern shapes on the workpiece; determining, using the processor, pattern sensitivity based on at least one topological description in the pattern shapes; and determining, using the processor, an expected defect count for each of the pattern shapes. Optionally, a subset of the pattern shapes can be inspected.

A non-transitory computer readable medium storing a program can be configured to instruct a processor to execute an embodiment of the method.

A system is provided in a second embodiment. The system includes an inspection tool configured to image a workpiece and a processor in electronic communication with the metrology tool. The processor is configured to: receive an initial probability of occurrence of a stochastic defect over an inspection area of a workpiece; sort all locations of the stochastic defects by the initial probability of occurrence; determine a cumulative expected defect count; normalize the cumulative expected defect count to be a fraction of a total expected defect count thereby determining a normalized cumulative expected defect count; and determine a number of defect locations to capture potential stochastic defects above a threshold of total stochastic defects. The initial probability of occurrence of a stochastic defect is generated using a model.

The processor may be further configured to associate the normalized cumulative expected defect count with a total count for the inspection area or with the inspection area.

The processor may be further configured to determine the initial probability of occurrence of a stochastic defect with the model.

The processor may be further configured to: select a subset of locations above the threshold; group the subset of locations by pattern shape thereby forming pattern shape groups; and sort the pattern shape groups by an expected defect count. The cumulative expected defect count is based on the pattern shape groups.

The processor may be further configured to select a subset of locations using the processor by probability. The cumulative expected defect count is based on the subset of locations. The threshold may be a fraction of defectivity, a number of locations, or a probability value.

The processor may be further configured to: select one or more of the defect locations above the threshold thereby generating selected defect locations; group the selected defect locations by pattern shapes on the workpiece; determine pattern sensitivity based on at least one geometric distance in the pattern shapes; and determine an expected defect count for each of the pattern shapes.

The processor may be further configured to select one or more of the defect locations above the threshold thereby generating selected defect locations; group the selected defect locations by pattern shapes on the workpiece; determine pattern sensitivity based on at least one topological description in the pattern shapes; determine an expected defect count for each of the pattern shapes.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

Stochastic failures are often found with an inspection tool and then characterized by a top-down SEM. Inspection and characterization may happen after lithography (after develop inspection (ADI)) or after a subsequent etch and clean step (after etch inspection (AEI) or after clean inspection (ACI)). The AEI/ACI result may be the most relevant to yield and depends on the remaining photoresist thickness at ADI. Embodiments disclosed herein can calibrate stochastic defect prediction models, such as accelerated rigorous models that need fine-tuning. The calibration can use less experimental data for calibration and can avoid geometric grouping of images. Instead, embodiments can utilize grouping of hotspot locations by predicted probability of defect. The predicted probabilities across the layout can be processed in a manner optimal for downstream applications such as hotspot inspection/monitoring or hotspot repair.

Figure 1:
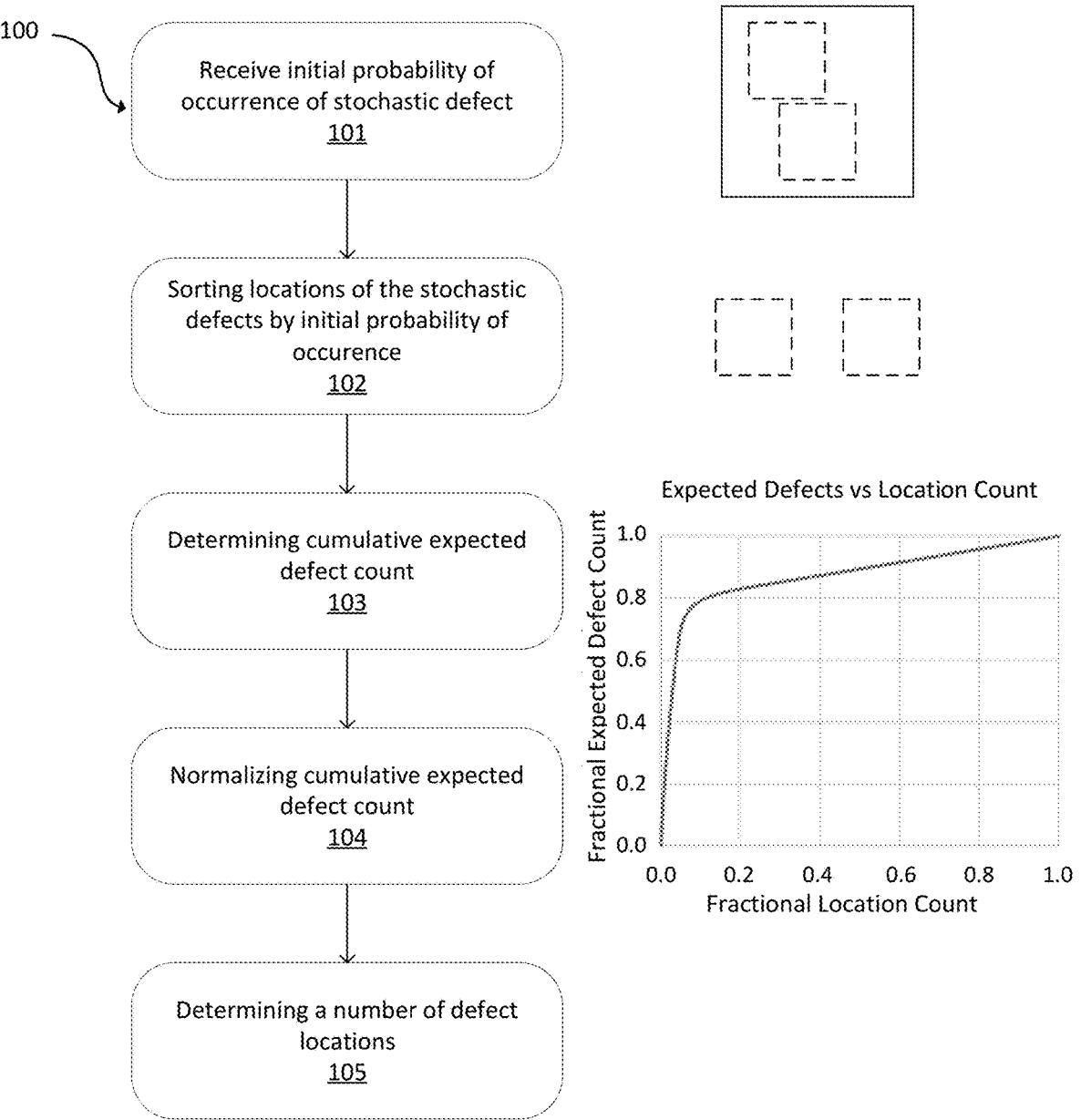
FIG. 1 illustrates an embodiment of a method in accordance with the present disclosure.

FIG. 1 shows an embodiment of a method 100. At least some of the steps of the method 100 can be performed using a processor. At 101, an initial probability of occurrence of a stochastic defect over an inspection area of a workpiece is received. This can be based on one or more images of the workpiece. The workpiece may be, for example, a semiconductor wafer or another type of workpiece. The initial probability of occurrence of a stochastic defect is generated using a model. The model may have been previously calibrated. In FIG. 1, the inspection area is represented by squares illustrated with a dashed line. While only part of the workpiece is shown, an entire workpiece surface can be analyzed.

The model may include a rigorous stochastic photolithography simulation model and/or a transformed model (e.g., by applying machine learning) that can empirically reproduce the stochastic defect probability predictions of the rigorous model while gaining speed of computation at the cost of minor degradation in accuracy for certain input samples. The model may be tuned for desired tradeoff between input space coverage, speed, and accuracy. An exemplary model is described in U.S. Pub. No. 2022/0129775, which is incorporated by reference in its entirety. The tunable parameters can belong to the model. While the model contains several parameters that are learned during a training phase, these tunable parameters typically affect global characteristics of the output of the model such as the quantity of hotspots detected and overall magnitude of predicted defect probabilities.

At 102, all locations of the stochastic defects are sorted by the initial probability of occurrence. The probability may be a percentage, which is sorted. The probability is linked to particular location on the workpiece.

A cumulative expected defect count is determined at 103. Expected defect count within an area can be determined as the sum of the probabilities of all the hotspots detected within the area. Image sweeping from 0% of the area to 100% of the area can occur (e.g., in a prioritized order). Then the cumulative expected defect count at a given area percentage can be determined as the sum of the expected defect counts within all regions up to a specific percentage of area. At 100% area, a cumulative expected defect count is the total number of defects expected to be observed across the whole area.

The cumulative expected defect count is normalized at 104 to be a fraction of a total expected defect count. This can determine a normalized cumulative expected defect count. Normalization can be performed by dividing every cumulative defect count value by the cumulative defect count at 100% area.

An optimal data volume (e.g., number of defect locations) to capture potential defects can be determined. For example, a data volume can be determined such that 50% of total defects are expected to be observed in a top 5% of locations. In another example, a data volume can be determined such that 80% of total defects are expected to be observed in a top 20% of locations. In another example, a data volume can be determined such that 95% of total defects are expected to be observed in a top 60% of locations. Other parameters are possible and these are merely examples.

A number of defect locations to capture potential stochastic defects above a threshold of total stochastic defects can be determined at 105. For example, a threshold may be selected based on the magnitude of defect probability that a semiconductor manufacturer can tolerate. The thresholding may be based on the probability. Another method is to set a threshold that selects the number of locations that is within the budget of inspection. The defect locations can then be imaged using an inspection tool. The model can be further validated based on this inspection and, optionally, calibrated.

The normalized cumulative expected defect count can be associated with a total count for the inspection area or the inspection area itself. An example of a chart showing example defects versus location count is shown in FIG. 1.

In an instance, the initial probability of occurrence of a stochastic defect can be determined with the model. The desired pattern on the photomask may be an input for the model. Besides the mask patterns, inputs for the model can include process parameters such as exposure dose, focus, source shape, photo-resist thickness, etch-resistance, etc.

In an embodiment, a subset of locations above the threshold are selected. A subset of locations is grouped by pattern shape thereby forming pattern shape groups. A pattern can be formed by the shapes within stated distance around given location. Patterns may be grouped together based on their geometrical similarity. The set of locations can be considered as a group if the difference between shapes forming each pattern does not exceed a predefined limit. The pattern shape groups are sorted by an expected defect count. The cumulative expected defect count is based on the pattern shape groups.

Figure 4:
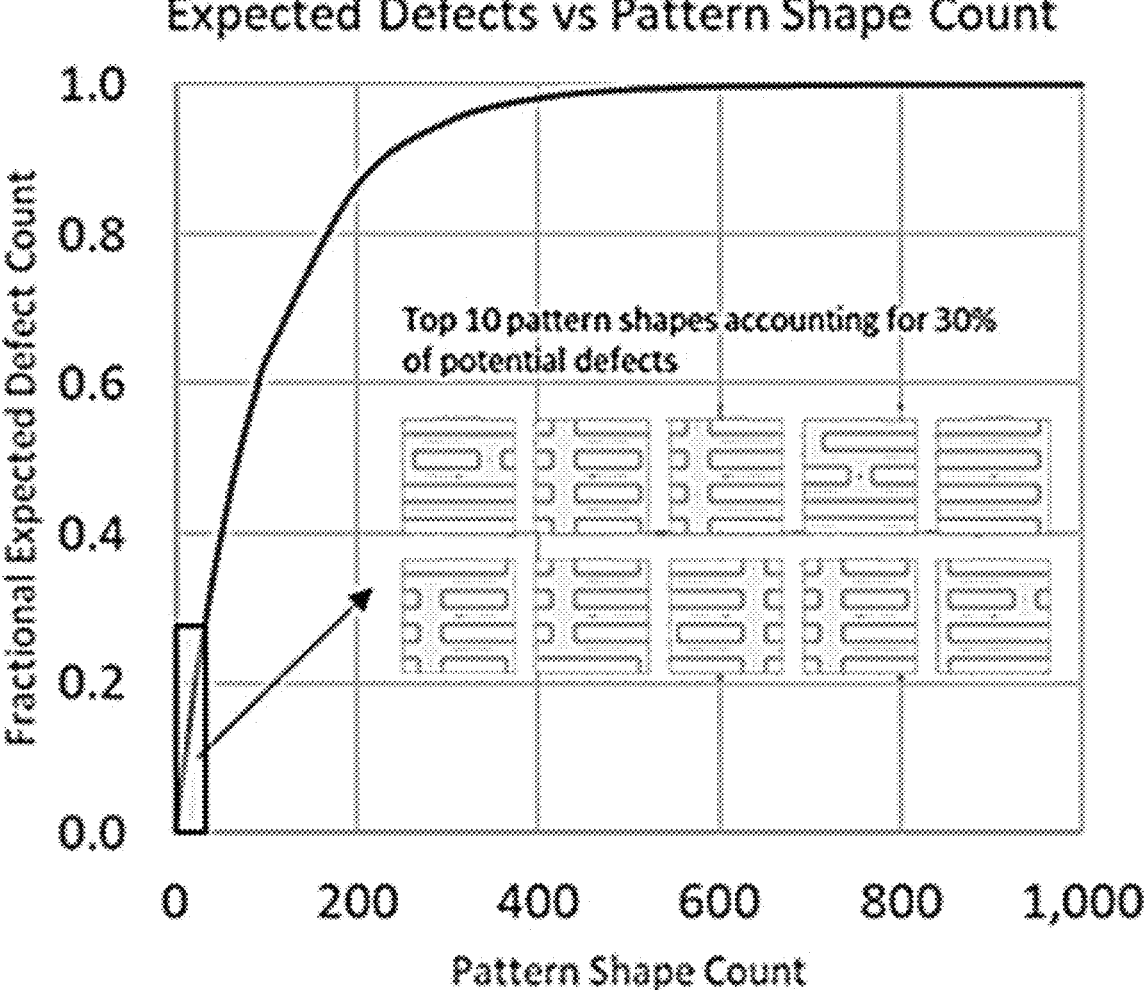
FIG. 4 is an exemplary chart showing expected defects versus pattern shape count.

An optimal data volume (e.g., pattern shape count) to capture potential defects can be determined. For example, a data volume can be determined such that 50% of total defects are expected to be observed in a top 70 pattern shapes. In another example, a data volume can be determined such that 85% of total defects are expected to be observed in a top 200 pattern shapes. In another example, a data volume can be determined such that 99% of total defects are expected to be observed in a top 500 pattern shapes. Other parameters are possible and these are merely examples. An example of a chart showing example defects versus pattern shape count is shown in FIG. 4.

In an embodiment, a subset of locations is selected by probability of defect occurrence. The cumulative expected defect count can be based on the subset of locations. The threshold can be a fraction of defectivity, a number of locations, or a probability value.

Figure 5:
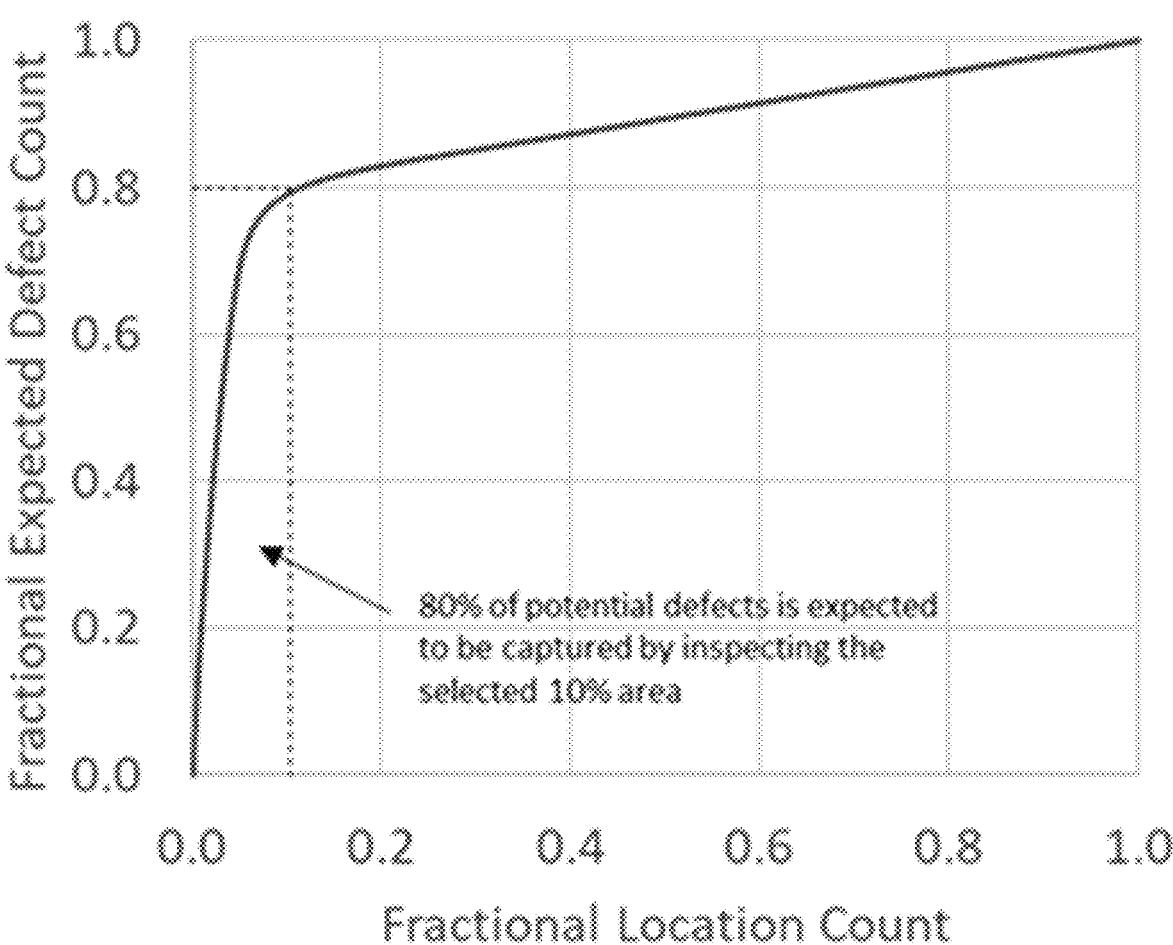
FIG. 5 is an exemplary chart showing expected defects versus location count.

An optimal data volume (e.g., defectivity) to capture potential defects can be determined. For example, a data volume can be determined such that a percentile of impact to defectivity (e.g., 80% of defectivity). In another example, a data volume can be determined such that it is within a budget of review (e.g., maximum 100,000 locations within a review budget). In another example, a data volume can be determined such that the focus is the highest probability of defect (e.g., ≥3 log-P). Other parameters are possible and these are merely examples. An example of a chart showing example defects versus location count is shown in FIG. 5.

In an embodiment, one or more of the defect locations above the threshold can be selected thereby generating selected defect locations. The selected defect locations are grouped by pattern shapes on the workpiece. Pattern sensitivity can be determined based on at least one geometric distance in the pattern shapes. The pattern sensitivity may be determined for each pattern shape that is indicative of pattern sensitivity. Sensitivity (susceptibility to defect formation) of pattern shape or pattern topology may be known for several candidates from historical process data or may also be known from historical simulation data. For example, the geometric distance can be the distance between a central hotspot location and its nearest polygon. Thus, design, pattern, or structural importance can be factors in the analysis. An expected defect count for each of the pattern shapes can be determined. Optionally, a subset of the pattern shapes can be inspected using an inspection system.

In an embodiment, one or more of the defect locations above the threshold can be selected thereby generating selected defect locations. The selected defect locations are grouped by pattern shapes on the workpiece. Pattern sensitivity can be determined based on at least one topological description in the pattern shapes. Pattern topological identity can be determined by the shapes closest to the pattern center. These patterns can include, for example, tip-to-tip, elbow, elbow-to-elbow, or two bars. An expected defect count for each of the pattern shapes can be determined. Defect probability and the number of instances of presence of the pattern shape within the layout may be used as inputs for the expected defect count. Optionally, a subset of the pattern shapes can be inspected using an inspection system. Optionally, a subset of the pattern shapes can be inspected using an inspection system.

In an example, pattern shapes are sorted by expected defect count and thresholded to desired number of locations. In another example, pattern shapes are sorted by expected defect count and thresholded to desired number of locations such that a maximum number of locations per shape is selected. In another example, pattern shapes are sorted by expected defect count. A cumulative expected defect count is determined and thresholded to a desired fraction of defectivity. In another example, pattern shapes are sorted by probability and are thresholded to desired number of pattern shapes or desired probability value. In another example, pattern shapes are sorted by geometrical distance and thresholded by the distance value. In another example, pattern shapes are sorted by expected defect count and thresholded on geometrical distance (e.g., design criticality, pattern importance, structural importance). The pattern shapes are then thresholded by number locations, number of patterns, or cumulative defect count.

Figure 6:
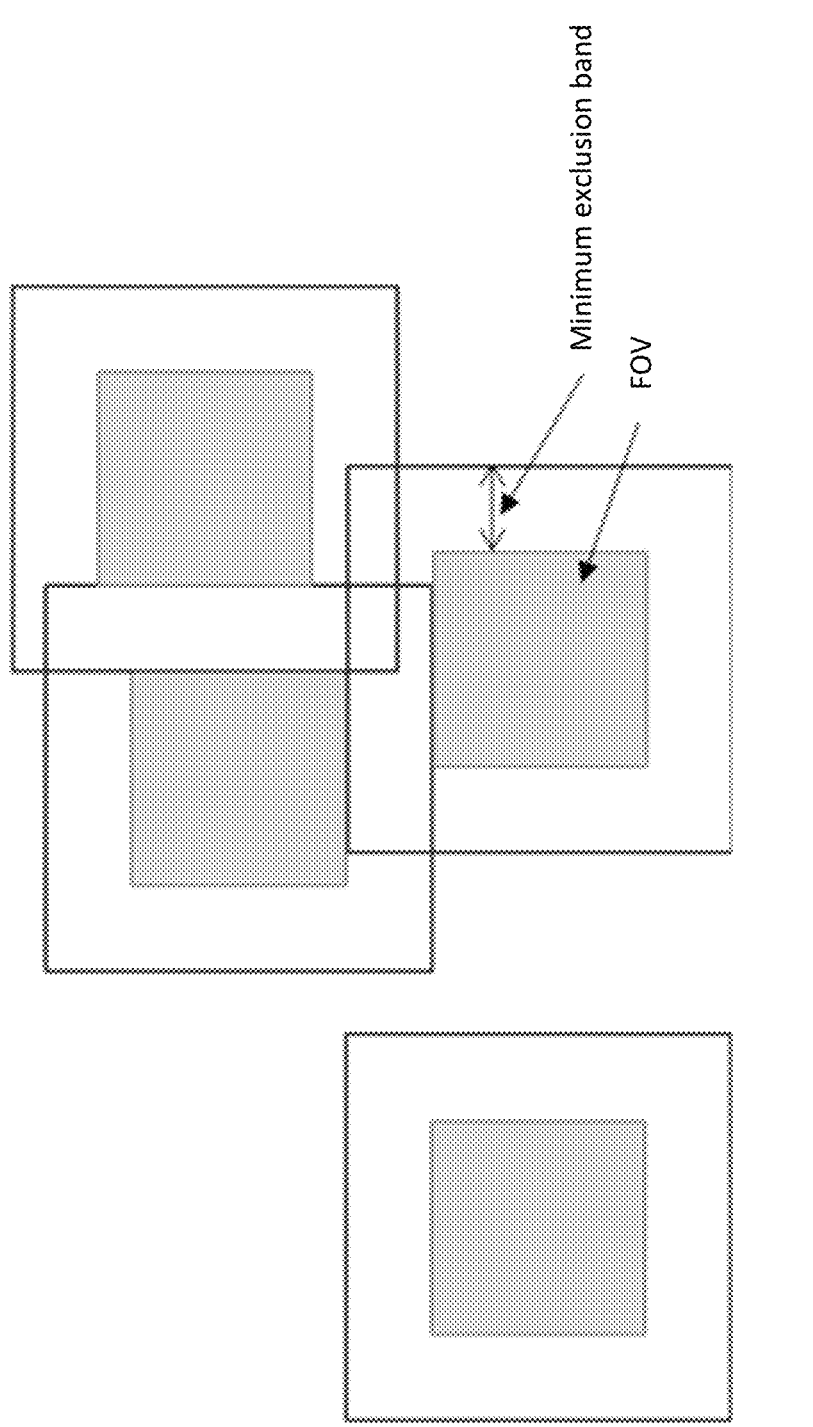
FIG. 6 shows an exemplary minimum exclusion band and a field of view.

In an embodiment, defect locations are processed to determine optimal regions of interest (ROIs) on the workpiece for inspection. This can apply constraints specific to the inspection system. For example, the ROIs can be equal or less than the field of view (FOV) for imaging with the inspection system. In other examples, positioning errors of the inspection system or minimum exclusion band between inspection sites can be compensated for. An exemplary minimum exclusion band and a field of view is shown in FIG. 6.

In an embodiment, after grouping by pattern shape, topological markup information (e.g., elbow, two-bar, or end-to-end, etc.) is included for each pattern shape that may be indicative of pattern sensitivity. For each topographical markup, calculate geometric information can be determined (e.g., end-to-end width, etc.). An expected defect count for each pattern shape can be estimated. Then, a subset of pattern shapes for inspection can be determined using various techniques. For example, the pattern shapes can be sorted by expected defect count. Cumulative expected defect count can be determined and thresholded to a desired fraction of defectivity. In another example, the pattern shapes can be sorted by probability. The pattern shapes can be thresholded to desired number of pattern shapes or desired probability value. In another example, the pattern shapes can be sorted by topological markup information such as end-to-end width and then thresholded. In another example, the pattern shapes can be sorted by probability and expected defect count. This is thresholded by topological information (e.g., end-to-end width) and then by probability, expected defect count, or cumulative defect count.

Figure 2:
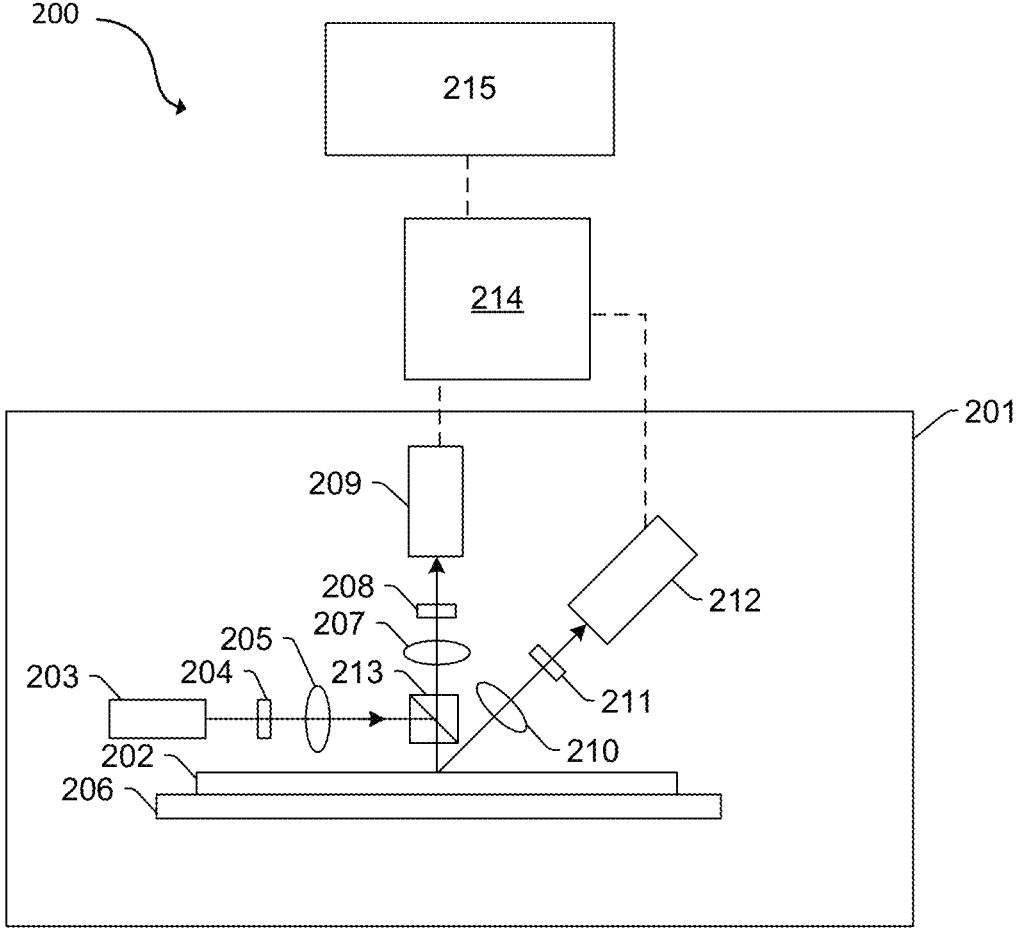
FIG. 2 is a diagram of an exemplary optical tool.

One embodiment of a system 200 is shown in FIG. 2. The system 200 includes optical based subsystem 201. In general, the optical based subsystem 201 is configured for generating optical based output for a workpiece 202 by directing light to (or scanning light over) and detecting light from the workpiece 202. In one embodiment, the workpiece 202 includes a wafer. The wafer may include any wafer known in the art. In another embodiment, the workpiece 202 includes a reticle. The reticle may include any reticle known in the art.

In the embodiment of the system 200 shown in FIG. 2, optical based subsystem 201 includes an illumination subsystem configured to direct light to workpiece 202. The illumination subsystem includes at least one light source. For example, as shown in FIG. 2, the illumination subsystem includes light source 203. In one embodiment, the illumination subsystem is configured to direct the light to the workpiece 202 at one or more angles of incidence, which may include one or more oblique angles and/or one or more normal angles. For example, as shown in FIG. 2, light from light source 203 is directed through optical element 204 and then lens 205 to workpiece 202 at an oblique angle of incidence. The oblique angle of incidence may include any suitable oblique angle of incidence, which may vary depending on, for instance, characteristics of the workpiece 202.

The optical based subsystem 201 may be configured to direct the light to the workpiece 202 at different angles of incidence at different times. For example, the optical based subsystem 201 may be configured to alter one or more characteristics of one or more elements of the illumination subsystem such that the light can be directed to the workpiece 202 at an angle of incidence that is different than that shown in FIG. 2. In one such example, the optical based subsystem 201 may be configured to move light source 203, optical element 204, and lens 205 such that the light is directed to the workpiece 202 at a different oblique angle of incidence or a normal (or near normal) angle of incidence.

In some instances, the optical based subsystem 201 may be configured to direct light to the workpiece 202 at more than one angle of incidence at the same time. For example, the illumination subsystem may include more than one illumination channel, one of the illumination channels may include light source 203, optical element 204, and lens 205 as shown in FIG. 2 and another of the illumination channels (not shown) may include similar elements, which may be configured differently or the same, or may include at least a light source and possibly one or more other components such as those described further herein. If such light is directed to the specimen at the same time as the other light, one or more characteristics (e.g., wavelength, polarization, etc.) of the light directed to the workpiece 202 at different angles of incidence may be different such that light resulting from illumination of the workpiece 202 at the different angles of incidence can be discriminated from each other at the detector(s).

In another instance, the illumination subsystem may include only one light source (e.g., light source 203 shown in FIG. 2) and light from the light source may be separated into different optical paths (e.g., based on wavelength, polarization, etc.) by one or more optical elements (not shown) of the illumination subsystem. Light in each of the different optical paths may then be directed to the workpiece 202. Multiple illumination channels may be configured to direct light to the workpiece 202 at the same time or at different times (e.g., when different illumination channels are used to sequentially illuminate the specimen). In another instance, the same illumination channel may be configured to direct light to the workpiece 202 with different characteristics at different times. For example, in some instances, optical element 204 may be configured as a spectral filter and the properties of the spectral filter can be changed in a variety of different ways (e.g., by swapping out the spectral filter) such that different wavelengths of light can be directed to the workpiece 202 at different times. The illumination subsystem may have any other suitable configuration known in the art for directing the light having different or the same characteristics to the workpiece 202 at different or the same angles of incidence sequentially or simultaneously.

In one embodiment, light source 203 may include a broadband plasma (BBP) source. In this manner, the light generated by the light source 203 and directed to the workpiece 202 may include broadband light. However, the light source may include any other suitable light source such as a laser. The laser may include any suitable laser known in the art and may be configured to generate light at any suitable wavelength or wavelengths known in the art. In addition, the laser may be configured to generate light that is monochromatic or nearly-monochromatic. In this manner, the laser may be a narrowband laser. The light source 203 may also include a polychromatic light source that generates light at multiple discrete wavelengths or wavebands.

Light from optical element 204 may be focused onto workpiece 202 by lens 205. Although lens 205 is shown in FIG. 2 as a single refractive optical element, it is to be understood that, in practice, lens 205 may include a number of refractive and/or reflective optical elements that in combination focus the light from the optical element to the specimen. The illumination subsystem shown in FIG. 2 and described herein may include any other suitable optical elements (not shown). Examples of such optical elements include, but are not limited to, polarizing component(s), spectral filter(s), spatial filter(s), reflective optical element(s), apodizer(s), beam splitter(s) (such as beam splitter 213), aperture(s), and the like, which may include any such suitable optical elements known in the art. In addition, the optical based subsystem 201 may be configured to alter one or more of the elements of the illumination subsystem based on the type of illumination to be used for generating the optical based output.

The optical based subsystem 201 may also include a scanning subsystem configured to cause the light to be scanned over the workpiece 202. For example, the optical based subsystem 201 may include stage 206 on which workpiece 202 is disposed during optical based output generation. The scanning subsystem may include any suitable mechanical and/or robotic assembly (that includes stage 206) that can be configured to move the workpiece 202 such that the light can be scanned over the workpiece 202. In addition, or alternatively, the optical based subsystem 201 may be configured such that one or more optical elements of the optical based subsystem 201 perform scanning of the light over the workpiece 202. The light may be scanned over the workpiece 202 in any suitable fashion such as in a serpentine-like path or in a spiral path.

The optical based subsystem 201 further includes one or more detection channels. At least one of the one or more detection channels includes a detector configured to detect light from the workpiece 202 due to illumination of the workpiece 202 by the subsystem and to generate output responsive to the detected light. For example, the optical based subsystem 201 shown in FIG. 2 includes two detection channels, one formed by collector 207, element 208, and detector 209 and another formed by collector 210, element 211, and detector 212. As shown in FIG. 2, the two detection channels are configured to collect and detect light at different angles of collection. In some instances, both detection channels are configured to detect scattered light, and the detection channels are configured to detect light that is scattered at different angles from the workpiece 202. However, one or more of the detection channels may be configured to detect another type of light from the workpiece 202 (e.g., reflected light).

As further shown in FIG. 2, both detection channels are shown positioned in the plane of the paper and the illumination subsystem is also shown positioned in the plane of the paper. Therefore, in this embodiment, both detection channels are positioned in (e.g., centered in) the plane of incidence. However, one or more of the detection channels may be positioned out of the plane of incidence. For example, the detection channel formed by collector 210, element 211, and detector 212 may be configured to collect and detect light that is scattered out of the plane of incidence. Therefore, such a detection channel may be commonly referred to as a "side" channel, and such a side channel may be centered in a plane that is substantially perpendicular to the plane of incidence.

Although FIG. 2 shows an embodiment of the optical based subsystem 201 that includes two detection channels, the optical based subsystem 201 may include a different number of detection channels (e.g., only one detection channel or two or more detection channels). In one such instance, the detection channel formed by collector 210, element 211, and detector 212 may form one side channel as described above, and the optical based subsystem 201 may include an additional detection channel (not shown) formed as another side channel that is positioned on the opposite side of the plane of incidence. Therefore, the optical based subsystem 201 may include the detection channel that includes collector 207, element 208, and detector 209 and that is centered in the plane of incidence and configured to collect and detect light at scattering angle(s) that are at or close to normal to the workpiece 202 surface. This detection channel may therefore be commonly referred to as a "top" channel, and the optical based subsystem 201 may also include two or more side channels configured as described above. As such, the optical based subsystem 201 may include at least three channels (i.e., one top channel and two side channels), and each of the at least three channels has its own collector, each of which is configured to collect light at different scattering angles than each of the other collectors.

As described further above, each of the detection channels included in the optical based subsystem 201 may be configured to detect scattered light. Therefore, the optical based subsystem 201 shown in FIG. 2 may be configured for dark field (DF) output generation for specimens 202. However, the optical based subsystem 201 may also or alternatively include detection channel(s) that are configured for bright field (BF) output generation for specimens 202. In other words, the optical based subsystem 201 may include at least one detection channel that is configured to detect light specularly reflected from the workpiece 202. Therefore, the optical based subsystems 201 described herein may be configured for only DF, only BF, or both DF and BF imaging. Although each of the collectors are shown in FIG. 2 as single refractive optical elements, it is to be understood that each of the collectors may include one or more refractive optical die(s) and/or one or more reflective optical element(s).

The one or more detection channels may include any suitable detectors known in the art. For example, the detectors may include photo-multiplier tubes (PMTs), charge coupled devices (CCDs), time delay integration (TDI) cameras, and any other suitable detectors known in the art. The detectors may also include non-imaging detectors or imaging detectors. In this manner, if the detectors are non-imaging detectors, each of the detectors may be configured to detect certain characteristics of the scattered light such as intensity but may not be configured to detect such characteristics as a function of position within the imaging plane. As such, the output that is generated by each of the detectors included in each of the detection channels of the optical based subsystem may be signals or data, but not image signals or image data. In such instances, a processor such as processor 214 may be configured to generate images of the workpiece 202 from the non-imaging output of the detectors. However, in other instances, the detectors may be configured as imaging detectors that are configured to generate imaging signals or image data. Therefore, the optical based subsystem may be configured to generate optical images or other optical based output described herein in a number of ways.

It is noted that FIG. 2 is provided herein to generally illustrate a configuration of an optical based subsystem 201 that may be included in the system embodiments described herein or that may generate optical based output that is used by the system embodiments described herein. The optical based subsystem 201 configuration described herein may be altered to optimize the performance of the optical based subsystem 201 as is normally performed when designing a commercial output acquisition system. In addition, the systems described herein may be implemented using an existing system (e.g., by adding functionality described herein to an existing system). For some such systems, the methods described herein may be provided as optional functionality of the system (e.g., in addition to other functionality of the system). Alternatively, the system described herein may be designed as a completely new system.

Figure 3:
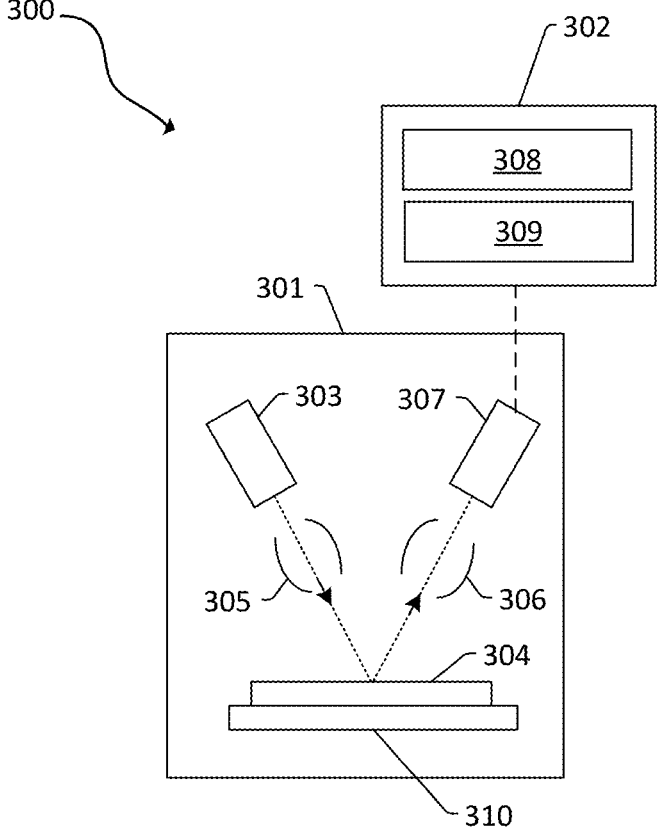
FIG. 3 is a diagram of an exemplary electron beam tool.

FIG. 3 is a block diagram of an embodiment of a system 300. The system 300 includes a wafer inspection tool (which includes the electron column 301) configured to generate images of a workpiece 304.

The wafer inspection tool includes an output acquisition subsystem that includes at least an energy source and a detector. The output acquisition subsystem may be an electron beam-based output acquisition subsystem. For example, in one embodiment, the energy directed to the workpiece 304 includes electrons, and the energy detected from the workpiece 304 includes electrons. In this manner, the energy source may be an electron beam source. In one such embodiment shown in FIG. 3, the output acquisition subsystem includes electron column 301, which is coupled to computer subsystem 302. A stage 310 may hold the workpiece 304.

As also shown in FIG. 3, the electron column 301 includes an electron beam source 303 configured to generate electrons that are focused to workpiece 304 by one or more elements 305. The electron beam source 303 may include, for example, a cathode source or emitter tip. The one or more elements 305 may include, for example, a gun lens, an anode, a beam limiting aperture, a gate valve, a beam current selection aperture, an objective lens, and a scanning subsystem, all of which may include any such suitable elements known in the art.

Electrons returned from the workpiece 304 (e.g., secondary electrons) may be focused by one or more elements 306 to detector 307. One or more elements 306 may include, for example, a scanning subsystem, which may be the same scanning subsystem included in element(s) 305.

The electron column 301 also may include any other suitable elements known in the art.

Although the electron column 301 is shown in FIG. 3 as being configured such that the electrons are directed to the workpiece 304 at an oblique angle of incidence and are scattered from the workpiece 304 at another oblique angle, the electron beam may be directed to and scattered from the workpiece 304 at any suitable angles. In addition, the electron beam-based output acquisition subsystem may be configured to use multiple modes to generate images of the workpiece 304 (e.g., with different illumination angles, collection angles, etc.). The multiple modes of the electron beam-based output acquisition subsystem may be different in any image generation parameters of the output acquisition subsystem.

It is noted that FIG. 3 is provided herein to generally illustrate a configuration of an electron beam-based output acquisition subsystem that may be used in the embodiments described herein. The electron beam-based output acquisition subsystem configuration described herein may be altered to optimize the performance of the output acquisition subsystem as is normally performed when designing a commercial output acquisition system. In addition, the systems described herein may be implemented using an existing system (e.g., by adding functionality described herein to an existing system). For some such systems, the methods described herein may be provided as optional functionality of the system (e.g., in addition to other functionality of the system). Alternatively, the system described herein may be designed as a completely new system.

Although the output acquisition subsystem is described above as being an electron beam-based output acquisition subsystem, the output acquisition subsystem may be an ion beam-based output acquisition subsystem. Such an output acquisition subsystem may be configured as shown in FIG. 3 except that the electron beam source may be replaced with any suitable ion beam source known in the art. In addition, the output acquisition subsystem may be any other suitable ion beam-based output acquisition subsystem such as those included in commercially available focused ion beam (FIB) systems, helium ion microscopy (HIM) systems, and secondary ion mass spectroscopy (SIMS) systems.

Embodiments of the system 200 and system 300 include a processor and electronic data storage unit, such as the processor 214 or processor 308 and the electronic data storage unit 215 or electronic data storage unit 309. The processor 214 or processor 308 may include a microprocessor, a microcontroller, or other devices. In an instance, the processor 309 is part of a computer subsystem, such as computer subsystem 302.

The processor 214 or processor 308, other system(s), or other subsystem(s) described herein may be part of various systems, including a personal computer system, image computer, mainframe computer system, workstation, network appliance, internet appliance, or other device. The subsystem(s) or system(s) may also include any suitable processor known in the art, such as a parallel processor. In addition, the subsystem(s) or system(s) may include a platform with high-speed processing and software, either as a standalone or a networked tool.

The processor 214 or processor 308 may be coupled to the components of the system 200 or system 300 in any suitable manner (e.g., via one or more transmission media, which may include wired and/or wireless transmission media) such that the processor 214 or processor 308 can receive output. The processor 214 or processor 308 may be configured to perform a number of functions using the output. The wafer inspection tool can receive instructions or other information from the processor 214 or processor 308. The processor 214 or processor 308 optionally may be in electronic communication with another wafer inspection tool, a wafer metrology tool, or a wafer review tool (not illustrated) to receive additional information or send instructions.

The processor 214 or processor 308 is in electronic communication with the wafer inspection tool, such as the detector 209, detector 212, or detector 307. The processor 214 or processor 308 may be configured to process images generated using measurements from a detector or perform other functions. For example, the processor may perform embodiments of the method 100 or method 200.

The processor 214 or processor 308 and its associated electronic data storage unit may be disposed in or otherwise part of the system 200 or system 300 or may be part of another device. In an example, the processor 214 or processor 308 and its associated electronic data storage unit may be part of a standalone control unit or in a centralized quality control unit. Multiple processors 214 or processors 308 or electronic data storage units may be used.

The processor 214 or processor 308 may be implemented in practice by any combination of hardware, software, and firmware. Also, its functions as described herein may be performed by one unit, or divided up among different components, each of which may be implemented in turn by any combination of hardware, software and firmware. Program code or instructions for the processor 214 or processor 308 to implement various methods and functions may be stored in readable storage media, such as a memory in the electronic data storage unit 215, electronic data storage unit 309, or other memory.

The processor 214 or processor 308 may be configured to perform a number of functions using the output of the system 200, system 300, or other output. For instance, the processor 214 or processor 308 may be configured to send the output to its respective electronic data storage unit or another storage medium. The processor 214 or processor 308 may be further configured as described herein.

The processor 214 or processor 308 may be configured according to any of the embodiments described herein. For example, the processor 214 or processor 308 can be configured to perform an embodiment of the method 100. The processor 214 or processor 308 also may be configured to perform other functions or additional steps using the output of the system 200, system 300, or using images or data from other sources.

If the system 200 or system 300 includes more than one processor 214 or processor 308, then the different subsystems may be coupled to each other such that images, data, information, instructions, etc. can be sent between the subsystems. For example, one subsystem may be coupled to additional subsystem(s) by any suitable transmission media, which may include any suitable wired and/or wireless transmission media known in the art. Two or more of such subsystems may also be effectively coupled by a shared computer-readable storage medium (not shown).

The processor used to perform the embodiments disclosed herein, such as the processor 214 or the processor 308, may be part of a single computer or a network of computers. The processor may include one or more CPU processors or may include a combination of CPU and GPU processors. In an example, there are 15 computer nodes in a network and each node includes forty-four CPUs and two GPUs with 385 GB of RAM and 500 GB of hard-disk space.

Various steps, functions, and/or operations of system 200, system 300, or the methods disclosed herein are carried out by one or more of the following: electronic circuits, logic gates, multiplexers, programmable logic devices, ASICs, analog or digital controls/switches, microcontrollers, or computing systems. Program instructions implementing methods such as those described herein may be transmitted over or stored on carrier medium. The carrier medium may include a storage medium such as a read-only memory, a random access memory, a magnetic or optical disk, a nonvolatile memory, a solid state memory, a magnetic tape, and the like. A carrier medium may include a transmission medium such as a wire, cable, or wireless transmission link. Therefore, the above description should not be interpreted as a limitation on the present disclosure but merely an illustration.

An additional embodiment relates to a non-transitory computer-readable medium storing program instructions executable on a controller for performing a computer-implemented method, as disclosed herein. In particular, an electronic data storage unit 215, electronic data storage unit 309, or other storage medium may contain non-transitory computer-readable medium that includes program instructions executable on a processor. The computer-implemented method may include any step(s) of any method(s) described herein, including an embodiment of the method 100.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes (MFC), Streaming SIMD Extension (SSE), or other technologies or methodologies, as desired.

Each of the steps of the method may be performed as described herein. The methods also may include any other step(s) that can be performed by the processor and/or computer subsystem(s) or system(s) described herein. The steps can be performed by one or more computer systems, which may be configured according to any of the embodiments described herein. In addition, the methods described above may be performed by any of the system embodiments described herein.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. A method comprising:

receiving, at a processor, an initial probability of occurrence of a stochastic defect over an inspection area of a workpiece, wherein the initial probability of occurrence of a stochastic defect is generated using a model;

sorting, using the processor, all locations of the stochastic defects by the initial probability of occurrence;

determining, using the processor, a cumulative expected defect count;

normalizing, using the processor, the cumulative expected defect count to be a fraction of a total expected defect count thereby determining a normalized cumulative expected defect count; and determining, using the processor, a number of defect locations to capture potential stochastic defects above a threshold of total stochastic defects.

2. The method of claim 1, further comprising associating the normalized cumulative expected defect count with a total count for the inspection area.

3. The method of claim 1, further comprising associating the normalized cumulative expected defect count with the inspection area.

4. The method of claim 1, further comprising determining the initial probability of occurrence of a stochastic defect with the model using the processor.

5. The method of claim 1, further comprising:

selecting a subset of locations above the threshold using the processor;

grouping the subset of locations by pattern shape using the processor thereby forming pattern shape groups; and sorting the pattern shape groups by an expected defect count using the processor;

wherein the cumulative expected defect count is based on the pattern shape groups.

6. The method of claim 1, further comprising selecting a subset of locations using the processor by probability, wherein the cumulative expected defect count is based on the subset of locations, and wherein the threshold is a fraction of defectivity.

7. The method of claim 1, further comprising selecting a subset of locations using the processor by probability, wherein the cumulative expected defect count is based on the subset of locations, and wherein the threshold is a number of locations.

8. The method of claim 1, further comprising selecting a subset of locations using the processor by probability, wherein the cumulative expected defect count is based on the subset of locations, and wherein the threshold is a probability value.

9. The method of claim 1, further comprising:

selecting, using the processor, one or more of the defect locations above the threshold thereby generating selected defect locations;

grouping, using the processor, the selected defect locations by pattern shapes on the workpiece;

determining, using the processor, pattern sensitivity based on at least one geometric distance in the pattern shapes; and determining, using the processor, an expected defect count for each of the pattern shapes.

10. The method of claim 9, further comprising inspecting a subset of the pattern shapes.

11. The method of claim 1, further comprising:

selecting, using the processor, one or more of the defect locations above the threshold thereby generating selected defect locations;

grouping, using the processor, the selected defect locations by pattern shapes on the workpiece;

determining, using the processor, pattern sensitivity based on at least one topological description in the pattern shapes; and determining, using the processor, an expected defect count for each of the pattern shapes.

12. The method of claim 11, further comprising inspecting a subset of the pattern shapes.

13. A non-transitory computer readable medium storing a program configured to instruct a processor to execute the method of claim 1.

14. A system comprising:

an inspection tool configured to image a workpiece; and a processor in electronic communication with the metrology tool, wherein the processor is configured to:

receive an initial probability of occurrence of a stochastic defect over an inspection area of a workpiece, wherein the initial probability of occurrence of a stochastic defect is generated using a model;

sort all locations of the stochastic defects by the initial probability of occurrence;

determine a cumulative expected defect count;

normalize the cumulative expected defect count to be a fraction of a total expected defect count thereby determining a normalized cumulative expected defect count; and determine a number of defect locations to capture potential stochastic defects above a threshold of total stochastic defects.

15. The system of claim 14, wherein the processor is further configured to associate the normalized cumulative expected defect count with a total count for the inspection area or with the inspection area.

16. The system of claim 14, wherein the processor is further configured to determine the initial probability of occurrence of a stochastic defect with the model.

17. The system of claim 14, wherein the processor is further configured to:

select a subset of locations above the threshold;

group the subset of locations by pattern shape thereby forming pattern shape groups; and sort the pattern shape groups by an expected defect count;

wherein the cumulative expected defect count is based on the pattern shape groups.

18. The system of claim 14, wherein the processor is further configured to select a subset of locations using the processor by probability, wherein the cumulative expected defect count is based on the subset of locations, and wherein the threshold is a fraction of defectivity, a number of locations, or a probability value.

19. The system of claim 14, wherein the processor is further configured to:

select one or more of the defect locations above the threshold thereby generating selected defect locations;

group the selected defect locations by pattern shapes on the workpiece;

determine pattern sensitivity based on at least one geometric distance in the pattern shapes; and determine an expected defect count for each of the pattern shapes.

20. The system of claim 14, wherein the processor is further configured to:

select one or more of the defect locations above the threshold thereby generating selected defect locations;

group the selected defect locations by pattern shapes on the workpiece;

determine pattern sensitivity based on at least one topological description in the pattern shapes; and determine an expected defect count for each of the pattern shapes.

* * * * *